June 11, 1957 A. L. JOHN 2,795,077
CASTING FLOAT HAVING DEPTH ADJUSTMENT MEANS
Filed Feb. 3, 1956 2 Sheets-Sheet 1
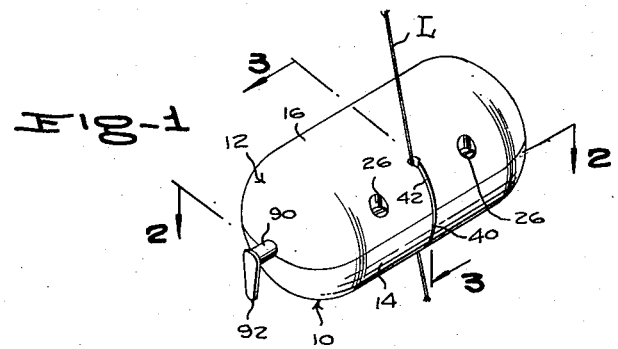
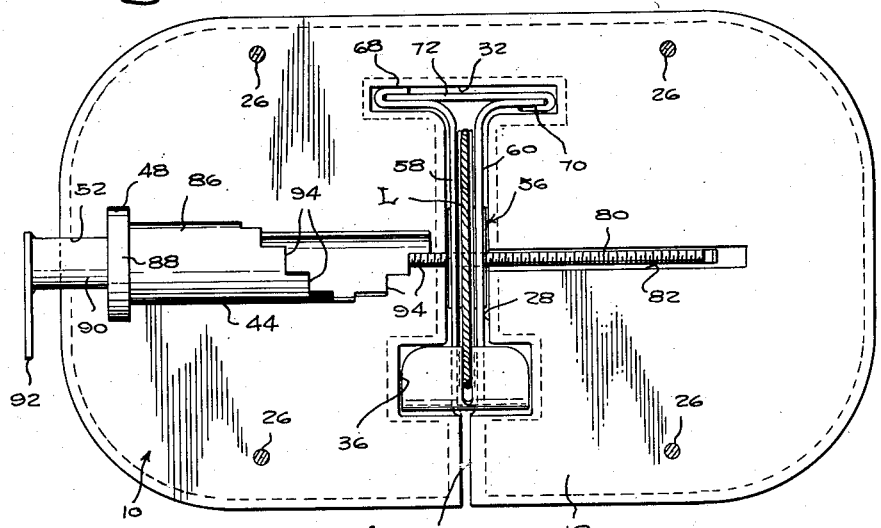
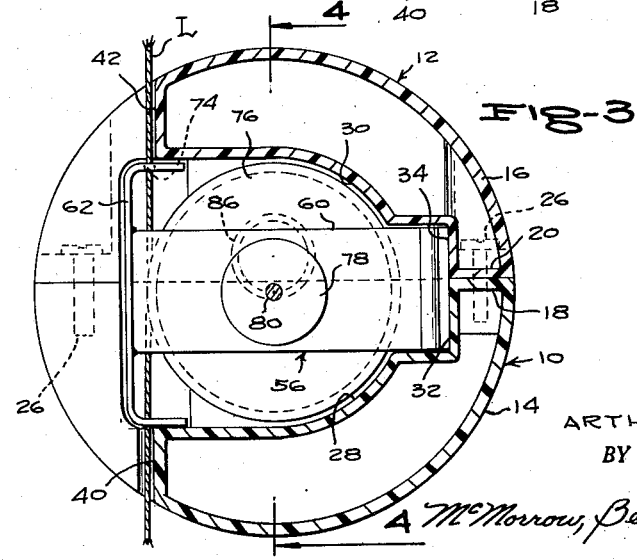
INVENTOR.
ARTHUR L. JOHN
BY
McMorrow, Berman + Davidson
ATTORNEYS

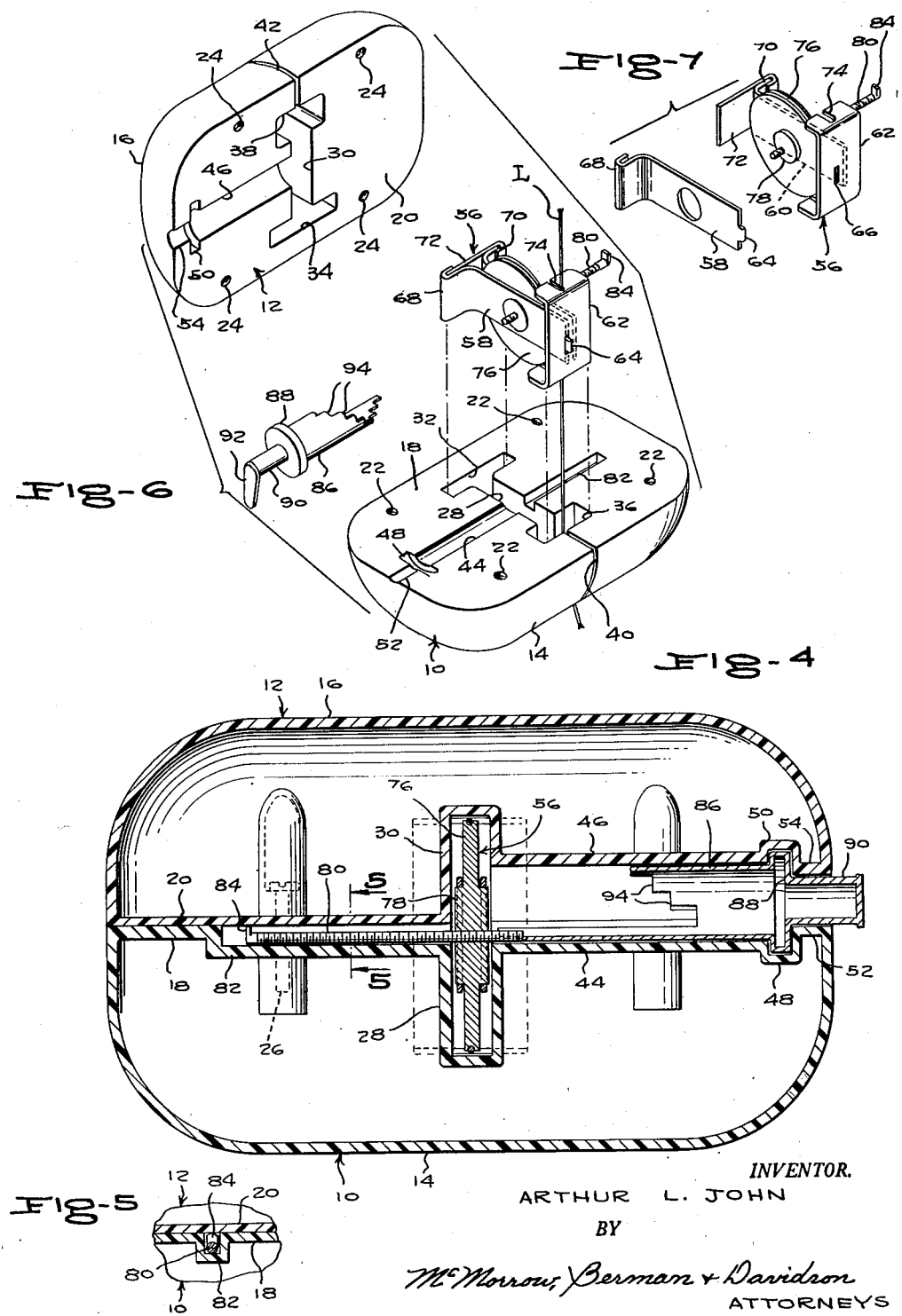

United States Patent Office 2,795,077
Patented June 11, 1957

2,795,077

CASTING FLOAT HAVING DEPTH ADJUSTMENT MEANS

Arthur L. John, Lima, Ohio

Application February 3, 1956, Serial No. 563,333

10 Claims. (Cl. 43—43.11)

This invention relates to fishing floats, and more particularly has reference to a float having incorporated therein a means whereby the float can be adjusted along the fishing line a selected distance from the sinker, with the adjustment being effected without removal of the sinker and hook, and without the formation of knots in the fishing line.

Ordinarily, when a float is to be adjusted along a fishing line to a selected location from the sinker, so that the sinker will be at a predetermined depth, no means is provided whereby the user can determine whether the float is at the exact location desired. In many instances, the fisherman will form knots in spaced intervals along the length of the line, to provide means for locating the float at a particular location upon the line. In other instances, measurements must be made to insure the proper positioning of the float. Still further, it is often necessary, in putting the float on the line or removing the same therefrom, to remove the sinker and hook and this is, of course, a time-consuming operation.

The main object of the present invention is to provide a float that will have means capable of being preset, after which pulling of the line through the float will ultimately cause the float to be disposed at a corresponding distance from the hook and sinker with further adjustment of the float away from the sinker being impossible.

A further object is to provide a device of the character referred to which will be particularly designed to facilitate attachment of the float to the line, and removal of the float from the line, without the requirement of first removing the hook and sinker.

Still another object is to provide a float of the type referred to which will be capable of being manufactured at low cost considering the benefits to be obtained from the use thereof, will be rugged and substantially trouble free in operation, and will be particularly designed for use in casting, although as will be presently made apparent the float is equally well adapted for use in other types of fishing operations.

Other objects will appear from the following description, the claims appended thereto, and from the annexed drawings, in which like reference characters designate like parts throughout the several views, and wherein:

Figure 1 is a perspective view of a float formed according to the present invention;

Figure 2 is an enlarged sectional view through the float on line 2—2 of Figure 1;

Figure 3 is a transverse sectional view on substantially the same scale as Figure 2, on line 3—3 of Figure 1;

Figure 4 is a longitudinal section, on the same scale as Figure 3, taken on line 4—4 of Figure 3;

Figure 5 is a detail section view on line 5—5 of Figure 4;

Figure 6 is an exploded perspective view of the float, the scale being enlarged slightly above that of Figure 1; and Figure 7 is an exploded perspective view of the pulley assembly of the float, shown per se.

The float constituting the present invention includes complementary semi-cylindrical float sections 10, 12 having rounded ends and formed as molded shells of plastic material or the like, the cavities of the respective shells being wholly sealed against the admission of air or water so as to impart the characteristics of buoyancy to the float.

The float section 10 includes a transversely curved outer wall 14, while section 12 includes a correspondingly but oppositely curved wall 16. Walls 14, 16 throughout their peripheries, are molded integrally with the peripheral portions of the float inner walls 18, 20, and formed in the section 10, adjacent the corners of wall 18, are openings 22 registering with smooth-walled openings 24 of section 12 to receive screws 26 whereby the sections are fixedly connected in face to face relation.

In the central portion of the inner walls 18, 20 there are formed opposed, narrow, semi-circular wells 28, 30 respectively cooperating to define, when the sections are connected, a substantially circular pulley housing lying in a plane normal to the longitudinal center line of the float. At one side of said housing, there is formed a chamber defined by housing extensions 32, 34 of the housing walls 28, 30, and said chamber as shown in Figure 6 is disposed transversely to the plane of the pulley housing. At the opposite side of the pulley housing, complementary extensions 36, 38 are formed on the walls of the pulley housing, forming a line-receiving chamber also disposed transversely to the plane of the pulley housing as shown in Figure 6.

In the side walls of the respective float sections, transverse slots 40, 42 are formed, and these are aligned so as to provide, at one side of the float, a transverse, narrow passage receiving the fishing line L. The slots communicate with the line-receiving chamber, and the line extends through said chamber as shown to particular advantage in Figures 2 and 3.

In the inner wall 18 of section 10, there is formed a longitudinal depression 44 extending to the pulley housing, and a corresponding, opposed depression 46 is formed in the inner wall 20 of section 12. The depressions cooperate to form a longitudinal passage of circular cross section extending medially between the opposite sides of the float and adjacent the outer end of said passage, the passage is enlarged through the provision of offset portions 48, 50 of the respective walls of the passage. Between the enlarged portion of the passage and the outer end thereof, the passage is reduced in diameter, by short wall portions 52, 54 extending from the offsets 48, 50.

A pulley assembly has been generally designated at 56, and includes bearing plates 58, 60. Plate 60 is welded or otherwise fixedly secured to a line guide 62, while the plate 58 has at one end a reduced tongue 64 removably engaged in a slot 66 formed in the guide 62. At its opposite ends, plate 58 has a lateral extension 68 terminating at its free end in a reversely directed flange.

The bearing plate 60, at the end thereof remote from the guide 62, has an outwardly directed lip 70, fixedly engaged in a flanged end portion of a connecting plate 72.

Due to this arrangement, the bearing plate 58 can be removed whenever desired so that a fish line can be extended through guide slots 74 formed in the flanged ends of the line guide 62 and can then be coiled between said slots, about a pulley 76 formed with a peripheral, line-receiving groove.

The pulley, at its center, has a hub 78, and this is rotatably engaged in large openings formed in the intermediate portions of the respective bearing plates.

Formed in the hub is a threaded opening and engaged in said opening is the inner end portion of an elongated, complementarily threaded shaft 80 seating in a longitudinal depression 82 of wall 18 and formed at its outer end with a radial finger 84 to hold the shaft against rotation.

Although the shaft is held against rotation, it is nevertheless shiftable axially within the depression 82, responsive to rotation of the pulley 76.

A stop sleeve 86 is seated in the passage defined by the depressed portions 44, 46 of walls 18, 20, and said sleeve is formed intermediate its ends with a collar 88 rotatably bearing in the enlarged portion of the sleeve-receiving passage. The outer end 90 of the sleeve is reduced relative to the main diameter of the sleeve and projects exteriorly of the shell, with the projecting end of the sleeve having a radially extending handle 92 to permit manual rotation of the sleeve.

At its inner end, the sleeve is cut away, along a spiralling path, and the spiralling inner end edge of the sleeve is formed with a continuous series of steps 94 each of which has an edge disposed in a plane normal to the length of the sleeve so as to provide an abutment for the shaft 80.

As will be noted from Figures 3 and 4, the axis of rotation of the sleeve is eccentric to the axis of the shaft, the shaft axis being disposed at the circumference of the sleeve so as to permit the inner end of the shaft to abut against any one of the abutments defined by the steps, responsive to rotation of the sleeve to a selected extent.

In other words, by rotation of the sleeve to a desired degree, the user locates an abutment a selected distance away from the pulley 76, and thereby limits axial movement of shaft 80 to a predetermined, desired extent. In use of the device, the screws 26 are first removed, and the pulley assembly is lifted out of the section 10 or 12, as the case may be. Then, the bearing plate 58 is detached from the guide 62, and line L is inserted in the slots of the guide 62, with the portion of the line between the slots being coiled once about the pulley. Then, with the line extending out of the float through the slots 40, 42, and with the bearing plate attached once again to the guide, the shell sections are connected together once again, it being understood that the flanged extension 68 of the bearing plate 58 will first have been clampably engaged with the connecting member 72.

The sleeve 86, preliminary to connection of the shell sections, is disposed in the longitudinal passage provided therefor, and the pulley assembly is seated in the approximately circularly shaped chamber defined between the sections at the inner end of the sleeve passage.

With the float assembled in the manner referred to, one is able to adjust the distance between the float and the sinker by first rotatably adjusting the sleeve, to dispose a selected abutment 94 in the path of the shaft 80. The shaft will at this time be spaced from said selected abutment, and as a next step, the user pulls upon the line, to provide the desired amount of line between the float and sinker. This rotates the pulley 76, and rotation of the pulley feeds the shaft 80 in an axial direction toward the abutment 94 selected by the previous rotation of the sleeve 86.

Ultimately, the shaft will engage against the abutment, and further rotation of the pulley wheel will be prevented, thus disposing the float at the selected distance from the sinker.

Of course, the markings could be dispensed with, and a trial-and-error method could be employed, that is, the sleeve could be rotatably adjusted, after which the line is pulled in the manner referred to. Then, should there be an insufficient amount of distance between the float and the sinker, the sleeve can be further adjusted and the line pulled once again until there is a proper depth adjustment for the sinker.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A fishing float adapted for effecting depth adjustments of an associated sinker connected to the float by a line, comprising: a buoyant body adapted for extension of a line therethrough; abutment means adjustably mounted in said body; means mounted in the body for movement toward and away from said abutment means, the abutment means extending in the path of movement of the second named means for limiting movement of the second named means toward the abutment means; and motion-translating means engaged with the second named means and engageable by said line, adapted for translating motion of the line through the body into motion of the second named means toward and away from the abutment means.

2. A fishing float adapted for effecting depth adjustments of an associated sinker connected to the float by a line, comprising: a buoyant body adapted for extension of a line therethrough; abutment means comprising a cylindrical member rotatably mounted in the body and having at its circumference a spiralling series of abutments; means mounted in the body for movement toward and away from said abutment means, said series extending in the path of the second named means for disposing a selected abutment in said path responsive to rotation of the cylindrical member to a selected extent, thus to adjustably limit movement of the second named means toward the abutment means; and motion-translating means engaged with the second named means and engageable by said line, adapted for translating movement of the line through the body into movement of the second named means toward and away from the abutment means.

3. A fishing float adapted for effecting depth adjustments of an associated sinker connected to the float by a line, comprising: a buoyant body adapted for extension of a line therethrough; abutment means comprising a cylindrical member rotatably mounted in the body and having at its circumference a spiralling series of abutments; a shaft mounted in the body for axial movement toward and away from said member, said series extending in the path of the shaft for disposing a selected abutment in said path, thus to adjustably limit movement of the shaft toward the cylindrical member, and motion-translating means engaged with the shaft and engageable by said line, adapted for translating movement of the line through the body into axial motion of the shaft toward and away from the abutment means.

4. A fishing float adapted for effecting depth adjustments of an associated sinker connected to the float by a line, comprising: a buoyant body adapted for extension of a line therethrough; abutment means comprising a cylindrical member rotatably mounted in the body and having at its circumference a spiralling series of abutments; a threaded shaft mounted in the body for axial movement toward and away from said member, said series extending in the path of the shaft for disposing a selected abutment in said path, thus to adjustably limit movement of the shaft toward the cylindrical member; and a pulley rotatably mounted in the body and having a threaded opening receiving the shaft, said pulley being adapted for rotation by the line on movement of the line through the body, thus to axially adjust the shaft toward and away from said cylindrical member.

5. A fishing float adapted for effecting depth adjustments of an associated sinker connected to the float by a line, comprising: a buoyant body adapted for extension of a line therethrough; a cylindrical member rotatably mounted in the body and having at its circumference a spiralling series of abutments; a threaded shaft mounted in the body for axial movement toward and away from said member, said series extending in the path of the shaft for disposition of a selected abutment in said path, thus to adjustably limit movement of the shaft toward the cylindrical member; and a pulley rotatably mounted in the body and having a threaded opening receiving the shaft, said pulley having a peripheral groove for looping of the line thereabout, whereby to rotate the pulley on movement of the line through the body, to in turn axially adjust the shaft toward and away from said cylindrical member.

6. A fishing float adapted for effecting depth adjustments of an associated sinker connected to the float by a line, comprising: a buoyant body having a transverse slot for passage of a line through the body; a cylindrical member mounted in the body for rotation about an axis normal to the slot, and having at its circumference a spiralling series of abutments; a threaded shaft axially movable within the body toward and away from said member along a path parallel to said axis, said series extending in the path of the shaft for disposition of a selected abutment in said path, thus to adjustably limit movement of the shaft toward the cylindrical member; and a pulley rotatably mounted in the body adjacent the slot and having a threaded opening receiving the shaft, said pulley having a peripheral groove for looping of the line thereabout, whereby to rotate the pulley on movement of the line through the body, to in turn axially adjust the shaft toward and away from said cylindrical member.

7. A fishing float adapted for effecting depth adjustments of an associated sinker connected to the float by a line, comprising: a buoyant body having a transverse slot for passage of a line through the body; a cylindrical member mounted in the body for rotation about an axis normal to the slot and having at its circumference a spiralling series of abutments, said member having one end projecting out of the body, for rotation of the member by a user; a threaded shaft axially movable within the body toward and away from said member along a path parallel to said axis, the body holding the shaft against rotation, said series extending in the path of the shaft for disposition of a selected abutment in said path, thus to adjustably limit movement of the shaft toward the cylindrical member; and a pulley rotatably mounted in the body adjacent the slot in a plane normal to the line of movement of the shaft and having a threaded center opening receiving the shaft, said pulley having a peripheral groove for looping of the line thereabout, whereby to rotate the pulley on movement of the line through the body, to in turn axially adjust the shaft toward and away from said cylindrical member.

8. A fishing float adapted for effecting depth adjustments of an associated sinker connected to the float by a line, comprising: a buoyant body having a transverse slot for passage of a line through the body; a cylindrical member mounted in the body for rotation about an axis normal to the slot and having at its circumference a spiralling series of abutments, said member having one end projecting out of the body, for rotation of the member by a user; a threaded shaft axially movable within the body toward and away from said member along a path parallel to said axis, the body holding the shaft against rotation, said series extending in the path of the shaft for disposition of a selected abutment in said path, thus to adjustably limit movement of the shaft toward the cylindrical member; and a pulley assembly in the body including a guide having a slot to receive the line, bearing plates connected to said guide, and a pulley rotatably supported by said plates adjacent the slot in a plane normal to the line of movement of the shaft, said pulley having a threaded center opening receiving the shaft, the pulley having a peripheral groove for looping of the line thereabout, whereby to rotate the pulley on movement of the line through the body, to in turn axially adjust the shaft toward and away from said cylindrical member.

9. A fishing float adapted for effecting depth adjustments of an associated sinker connected to the float by a line, comprising: a buoyant body having a transverse slot for passage of a line through the body; a cylindrical member mounted in the body for rotation about an axis normal to the slot and having at its circumference a spiralling series of abutments, said member having one end projecting out of the body, for rotation of the member by a user; a threaded shaft axially movable within the body toward and away from said member along a path parallel to said axis, the body holding the shaft against rotation, said series extending in the path of the shaft for disposition of a selected abutment in said path, thus to adjustably limit movement of the shaft toward the cylindrical member; and a pulley assembly in the body including a guide having a slot to receive the line, bearing plates connected to said guide, and a pulley rotatably supported by said plates adjacent the slot in a plane normal to the line of movement of the shaft, said pulley having a threaded center opening receiving the shaft, the pulley having a peripheral groove for looping of the line thereabout, whereby to rotate the pulley on movement of the line through the body, to in turn axially adjust the shaft toward and away from said cylindrical member, one at least of said bearing plates being detachable from the guide for positioning of the line in the slots of the guide and for looping of the line about the pulley.

10. A fishing float adapted for effecting depth adjustments of an associated sinker connected to the float by a line, comprising: a buoyant body having a transverse slot for passage of a line through the body; a cylindrical member mounted in the body for rotation about an axis normal to the slot and having at its circumference a spiralling series of abutments, said member having one end projecting out of the body, for rotation of the member by a user; a threaded shaft axially movable within the body toward and away from said member along a path parallel to said axis, the body holding the shaft against rotation, said series extending in the path of the shaft for disposition of a selected abutment in said path, thus to adjustably limit movement of the shaft toward the cylindrical member; and a pulley assembly in the body including a guide having a slot to receive the line, bearing plates connected to said guide, and a pulley rotatably supported by said plates adjacent the slot in a plane normal to the line of movement of the shaft, said pulley having a threaded center opening receiving the shaft, the pulley having a peripheral groove for looping of the line thereabout, whereby to rotate the pulley on movement of the line through the body, to in turn axially adjust the shaft toward and away from said cylindrical member, one at least of said bearing plates being detachable from the guide for positioning of the line in the slots of the guide and for looping of the line about the pulley, said body comprising complementary sections detachably connected to one another, said sections having opposed, communicating recesses and said assembly being removably supported in said recesses, the sections additionally having opposed, communicating longitudinal recesses cooperating to provide a cavity in which the cylindrical member is rotatably supported, one of the sections having a longitudinal passage receiving said shaft.

References Cited in the file of this patent
UNITED STATES PATENTS

| | | |
|---|---|---|
| 2,682,129 | Hamilton | June 29, 1954 |
| 2,704,414 | Westnes | Mar. 22, 1955 |
| 2,728,161 | Mangel et al. | Dec. 27, 1955 |